United States Patent [19]

Odar

[11] 4,269,215

[45] May 26, 1981

[54] VAPOR FLOW CONTROL VALVE

[75] Inventor: Larry F. Odar, Northbrook, Ill.

[73] Assignee: Rego Company, Chicago, Ill.

[21] Appl. No.: 954,525

[22] Filed: Oct. 25, 1978

[51] Int. Cl.³ .............................................. F10K 17/28
[52] U.S. Cl. ..................................... 137/75; 137/517;
137/498; 137/460; 251/82
[58] Field of Search .................. 137/38, 39, 460, 498,
137/517, 581, 75–77; 251/82

[56] References Cited

U.S. PATENT DOCUMENTS

| 1,028,681 | 6/1912 | Creighton et al. | 137/77 |
| 3,631,893 | 1/1972 | Seaman et al. | 137/599.2 X |
| 4,099,551 | 7/1978 | Billington et al. | 251/294 X |

FOREIGN PATENT DOCUMENTS 1285287  1/1962  France ..................................... 251/260

Primary Examiner—Alan Cohan
Attorney, Agent, or Firm—Sixbey, Friedman & Leedom

[57] ABSTRACT

A vapor pressure equalizing valve disposed in a vapor return conduit between a storage tank and a liquid receiving tank to provide the same volume of flow but at a higher rate and greater fluidity than that of liquid flow volume in a preferably larger liquid conduit, and providing an excess flow shut off response that can be triggered manually or by the danger of a hose rupture or in case of fire or a break in the vapor return conduit, to protect either tank, or with two valves protect both tanks, with great quickness of action. The valve serves as a manual vapor flow shut off valve which may be latched open; and is unlatched to close by a local or remote control or fire, but while latched open provides an excess flow arresting action.

1 Claim, 4 Drawing Figures

VAPOR FLOW CONTROL VALVE

BACKGROUND OF THE INVENTION

In the sale and distribution of liquified petroleum fuel gas (L.P. Gas) to individual customers it is conventional for a distributor to use stationary, above ground bulk storage tanks, as large as sixty thousand gallons, to store the highly volatile and inflammable liquid under substantial vapor gauge pressure and then distribute it to customers by delivery truck tanks that are filled repeatedly from the storage tanks with the use of liquid flow and vapor return conduits that include flexible hoses detachably connected to the truck delivery tank. These conduits are permanently connected to the bulk storage tanks and have automatic cut off flow control valves between the storage tank and the hoses, and shut off valves at the free ends of the hoses connectible to truck tanks which in turn have safety flow check valves protecting it. The present invention is concerned with an excess vapor pressure equalizing return flow valve usable at either or both ends of the flexible hose.

By way of illustrating the extensive usefulness of this valve it is desirable that the conduits include quite flexible hoses to accommodate a random and quick positioning of a tank truck for rapid connection thereto and filling. Preferably the transfer hoses are short, approximately ten feet long (3 meters), and are comparatively small 1 ¼" and 2" (32 mm and 52 mm) in diameter for strength and ease of handling of vapor and liquid respectively, and also for rapid filling while, for safety, minimizing the volume of liquified gas present at any given time in the hoses between the tanks. The liquified gas in its liquid state may be forced by pump to flow or be permitted to flow under the influence of gravity through the liquid filler hose, with vapor pressures being equalized between the tanks by vapor return flow to minimize tank filling time and maximize customer deliveries.

Aside from maintaining the handling and filling equipment in acceptably safe condition, and in addition to dangers of fire and faulty equipment, an ever present random danger conventionally exists in which, for any one of several reasons, a delivery truck driver receiving L.P. Gas will occasionally move his truck during filling, or drive his replenished truck away while the hoses are still connected between the truck tank and storage tank. This can rupture either or both the hoses under substantial tension and gas pressure forces, and generally after such a hose rupture, there is substantial pressurized spillage of liquefied gas that rapidly creates a highly dangerous fire hazard before, and regardless of, the automatic closing of safety flow-check valves after a break. Substantial amounts of vaporized and expanding gas escape before conventionally arranged valves are effective. Automatic outflow cut-off transfer valves have been used such as described and claimed in application Ser. No. 708,128, where a trip cut-off cord is connected to the truck which trips a valve by unlatching a stop that supports a spring for closing a check valve in the outflow to the hose. Many times it has been found that the cord is not attached to the truck during filling operations.

However, if both hoses are ruptured, the escape of liquid provides a greater danger than escape from the vapor hose although already vaporized gas is one step closer to combining with air to provide an immediately combustible mixture which has explosive potential.

In the present invention, the valves are closed before a rupture occurs in either hose and at most any escaping gas would be only that in the filler hose. The check valve in the invention not only closes in the direction of outflow of vapor, it also closes the valve if a fire may already have been started from sparks or any one of several other reasons, thereby confining spillage to the short hose contents which if ignited would quickly burn out with minimal escape of gas with a fuse metal release also assuring automatic closing of a dispensing valve. These are improved safety steps.

One of the objects of the invention is to compel the followance of the proper sequence of the truck tank filling procedure in a way which automatically prevents any hazardous spillage if there is an inadvertant drive away without disconnection, and, prevents any further use without attention and repair.

Another object of the present invention is to enable quick preliminary equalization of vapor pressures between the two tanks for liquid transfer in that excess vapor flow closing sensitivity can be minimized if manually held but when unattended the sensitivity is automatically in effect.

Among the objects of the invention is the control and limiting of the escape of hazardous vapor to only a readily dispersible known amount and confine any damage to preventive equipment that is easily restored or replaced;

(a) to assure good inspection, testing and upkeep of frangible safeguards including hoses provided for the ultimate prevention of dangerous break-away spillage and fires;

(b) and safeguarding truck filling equipment against damage of any parts other than a replaceable preassembled hose unit rigidly supported against movement at its storage tank end.

The inertia force of flowing vapor in a conduit is less than that of liquid flowing in the same size conduit and to augment the prompt effectiveness of vapor it is preferred that the vapor conduit be appreciably smaller than the liquid conduit to assure a prompt vapor valve closure. Also in the connection preceding the closing of the valve the normal return movement of vapor to the bulk tank having minimal inertia can reverse its flow direction and accelerate quickly its effort for closing the vapor flow conduit at the valve.

SUMMARY OF THE INVENTION

The transfer of liquefied petroluem gas from a bulk storage tank to a truck delivery tank is made through stretchable flexible hoses secured to automatic shut off vapor and liquid flow control valves that are rigidly secured to storage tank supply conduits at one end and carrying at their other ends non-extendible cables secured adjacent to the detachable truck ends of the hoses with the free moving ends of the cables to the liquid and vapor conduits of the bulk storage tank. The cables are supported on the hoses whereby the valves are activated to close by tension displacement of the cables when the hoses are physically stretched by premature truck movement to an extent almost to the rupture point of at least one of the hoses. The flow cut-off valves are activated by the cables as described herein and in this application to confine any escape of vapor to the residual amount of vapor in a hose or the hoses ruptured.

IN THE DRAWINGS

DESCRIPTION OF THE INVENTION

Figure 4:
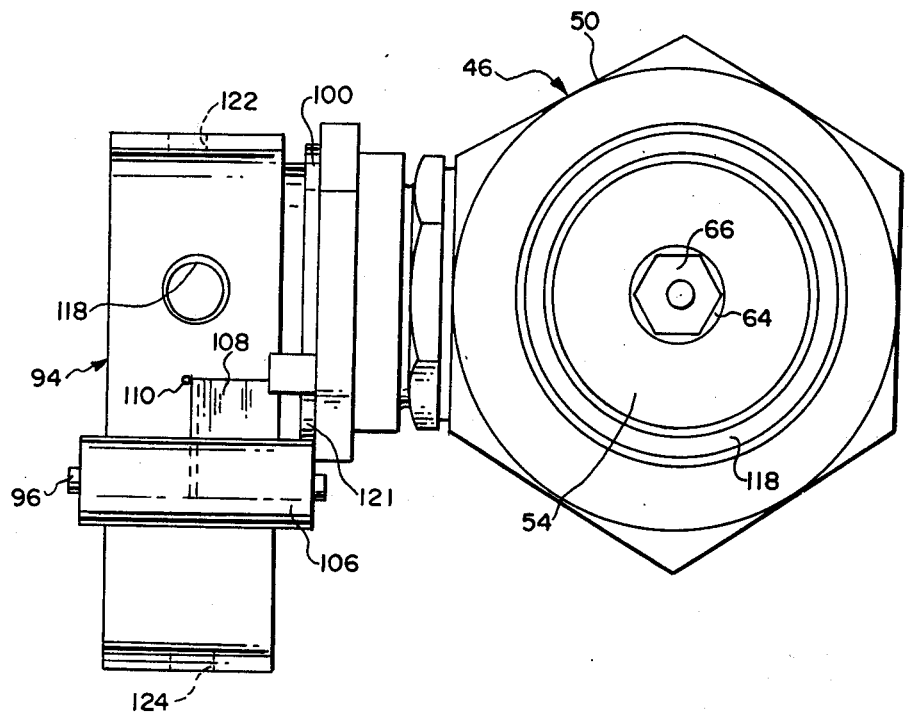
FIG. 4 is an end view partly in section.
Figure 1:
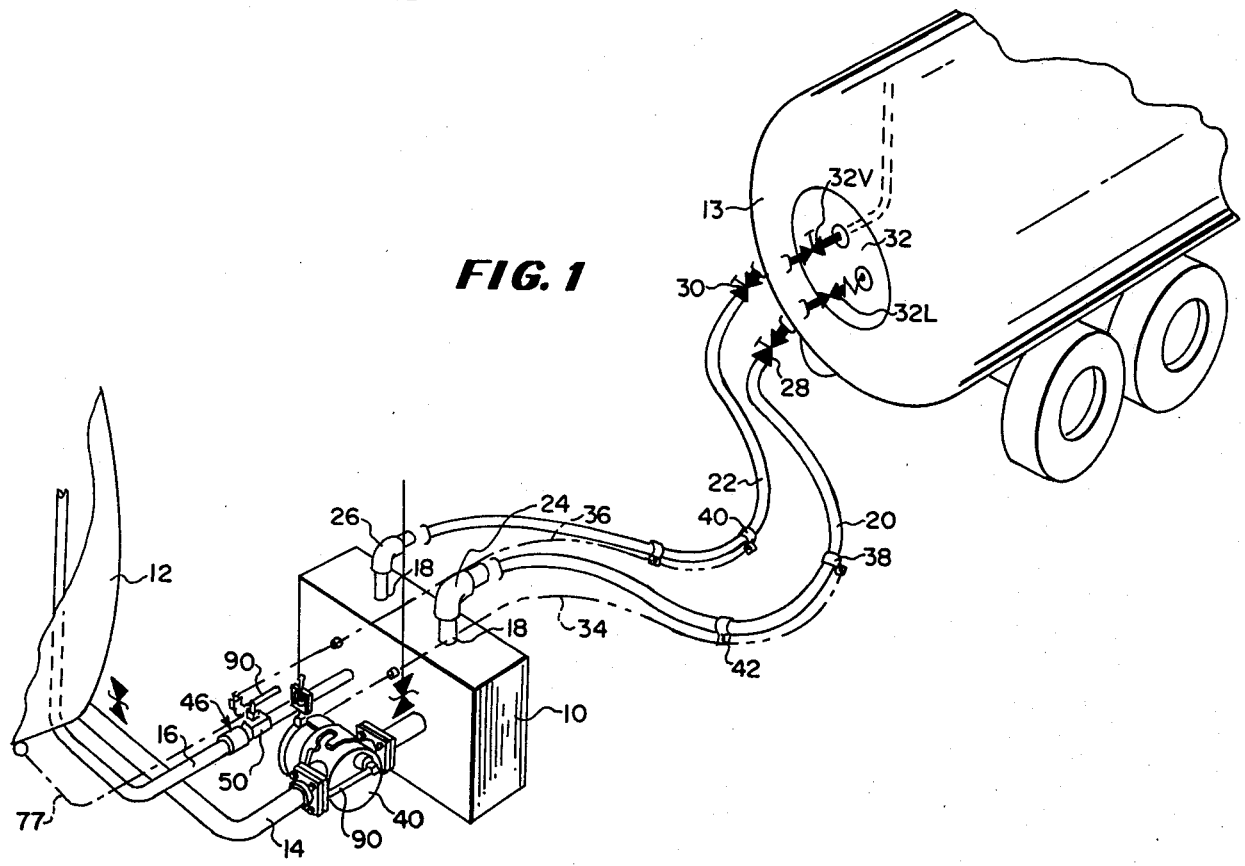
FIG. 1 is a schematic perspective view of a plant loading employing the valve of the present invention in the vapor return conduit and a swing check emergency cut off valve described in an accompanying application that serves as a shut-off valve in the liquid conduit, both equipped and connected to a truck delivery tank ready for liquid transfer.
Figure 3:
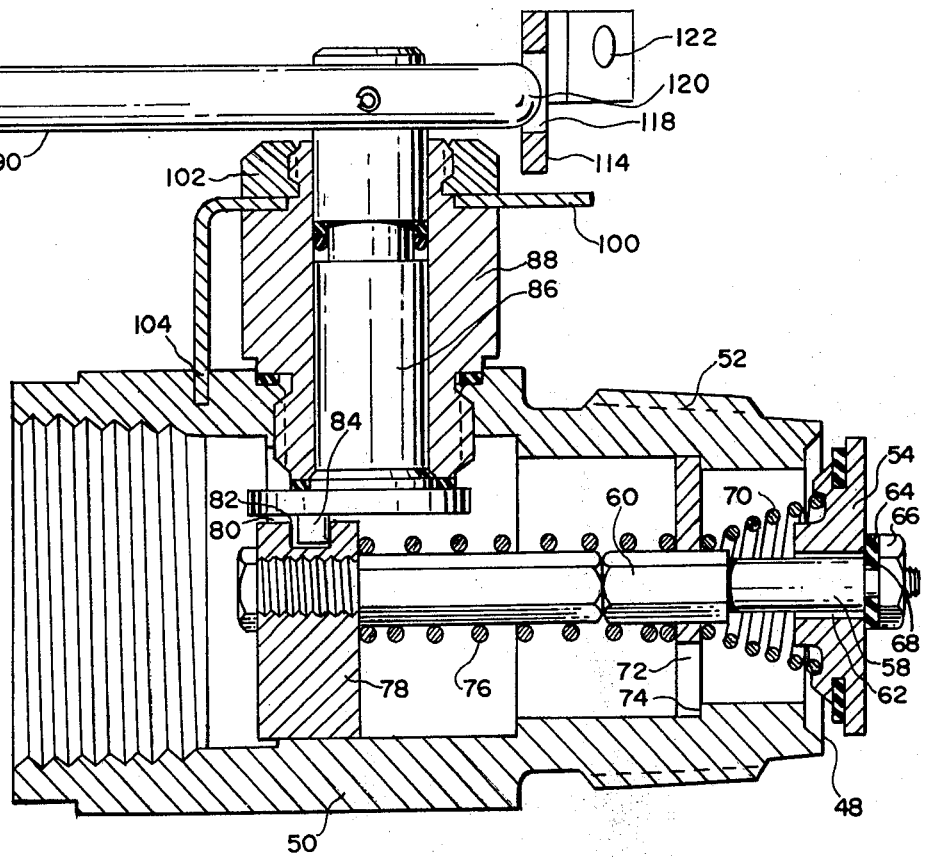
FIG. 3 is a vertical-longitudinal sectional view of the vapor flow check valve shown in FIG. 2.

An L.P. Gas bulk storage and truck tank loading station is illustrated in FIG. 1 preferably provided with a cement bulkhead 10 serving in part as a fire barrier and also for seperating the truck filling area from the storage area to protect the bulk storage tank 12 premises against physical damage from mobile equipment. The dispensing system for the tank includes a liquid supply conduit 14 from the tank 12 and a vapor return conduit 16 to the tank. These elements preferably are made of rigid material and extend through and slightly beyond and are firmly embedded as at 18 in the cement of the bulkhead 10 so that they are anchored to the earth to obviate any strains upon the rigid piping 14 and 16 with respect to the storage tank 12. They extend a short distance beyond the bulkhead to provide rigid hose attachment extensions 24 and 26, respectively.

The protective equipment on the storage tank side of the bulkhead 10, not only includes novel controls and valves, themselves embodying invention, in the conduits 14 and 16 but also flow control dispensing and safety valves (not illustrated) that are required by Government Regulations at the conduit connections 14 and 16 to the bulk storage tank.

On the truck tank 13 side of the bulkhead 10, the conduit system includes flexible hoses 20 and 22 secured to the rigid extensions 24 and 26, for liquid filling and vapor return, and, at their free ends the hoses carry shut off valves 28 and 30 which in turn are connectible to the truck filler valve system 32 which includes a manual shut-off vapor valve 32V with an automatic emergency liquid back flow cut off valve 32L, conventionally required as safety equipment to protect against escape of fuel if the hoses become defective or are inadvertently disconnected. The hoses serve as flexible extensions of the conventional rigid liquid supply conduit 24 and a rapid pressure equallizing return conduit 26 for fast filling operations. In the liquid conduit leading from the storage tank, and, supported in parallel relationship therewith, is a safety shut-off, non-extendible cable means 34 and 36, respectively secured at one end 38 and 40 to the hoses 20 and 22, adjacent to the truck valve end and moveable a substantial distance at the other end with respect to the associated hose. Thereby, when the hose is stretched, the cables are tightened to actuate a cut-off of the filling of the truck delivery tank. The stretching performs work to shut off flow in either hose before a hose connection can be or is ruptured by any additional stretching and bursting while carrying a gauge pressure under conditions which might present a fire hazard. This anticipation and this securement possibility greatly reduces extensive dangers conventionally present in the field.

Although many hose materials or known tubular reinforcement weave patterns can be used for the flexible filler and vapor return hoses 20 and 22 for quick connection and transfer of liquified petroleum gas from the bulk storage tank 12 to a mobile truck delivery tank 13, it is preferred for the invention, to provide an appreciable extendibility before the hose is damaged to provide a variable hose elongation under varying tensions with the slow truck start up that may perform work while conditions are still safe for property and personnel.

Thereby, not only does the invention provide a quick and easy hook-up between non-aligned pipe fittings and also tends to stiffen and straighten the hoses under applied internal pressures, when free to do so, but may elongate stretchably a substantial distance before tearing, such capability as a mechanical operation, serving many purposes related to safety and prevention of waste.

The flexible conduits 20 and 22 do not lengthen appreciably under internal pressure, but preferably have a stretchable weave reinforcing a tubular elastomeric member that tends to straighten under interal pressure and yet stretch to an appreciable extent under a varying longitudinal stretch tension externally imposed thereupon. Either one, or preferably both hoses, carry non-extendible safety control cables 34 and 36 that are paired with and terminally secured to the hoses 24 and 26 adjacent their free ends as indicated by clamps 38 and 40, respectively. Although the cables may be paired with the respective hoses, each pair is shown disposed in parallel relationship and provided with eyelets 42 carried by the hoses over their respective overlapping lengths to provide relative free parallel movement between the members of each pair.

The free ends of the cables 34 and 36 extend freely through the bulkhead 10 for connection to the respective flow control valves 44 and 46 in the liquid flow and vapor return conduits 20 and 22, respectively. Preferably the centers of the respective pairs of conduit and cable openings through the barrier 10 are spaced vertically with respect to each other so that horizontal movement of the attached truck ends of the hose and cable will not appreciably vary their relative working lengths with respect to controls supported on the bulkhead 10.

Thereby, if either or both of the hoses are stretched by any truck pull-away movement, as when the hoses 20 and 22 stretch and move with respect to their respective cables 34 and 36 to pull the cables when the hoses are placed under stretch strain approaching that which might otherwise be sufficient to cause the hose to tear and burst or not work at all, the free ends of the cables are displaced substantially and at least one of them will actuate and trigger the release of the respective flow check valves 44 or 46, or both, to permit them to be moved to their closed position, by spring or by fluid pressure flow through them.

Thus, being carried by the hoses themselves the non-extendible cables are always present and can be used automatically and manually when needed for safety sake. They are also easy to inspect and keep in good repair for actuating one or more reliable safety-closures of storage tank flow cut off valves before a hose rupture occurs if there is such a danger developing. The presence of this stretch characteristic in the hose itself assures not only its constant presence safety wise, but also an optimum relation in which the adjustment of such a cable means will enable any degree of shut off stretching desired before the hoses are torn open by a truck pull away. Such can be provided and be adjusted any time at the filling site. Also if the hose is not kept in top condition it will only operate just that much faster.

A stretchable hose 20 or 22, being the element carrying the safety cut off control cable 34, or 36 respectively, not only will be present always, and, be maintained in good condition at the bulk storage site, but the safety cable is always armed continuously for effectiveness under many contingencies related to storage tank outlet valves being left open and only the shut off valves 28 and 30 being operated in a succession of service tank filling uses, as described they are designed for a variety of contingencies that could be involved including the fuses and remote controls. Then, it is of ultimate importance that even if the hose, in stretching, is ultimately ruptured, the danger of fire and loss of liquefied gas is greatly reduced and limited to the fluid volumes of hoses themselves which with these safe guards preferably need be only ten feet (3 meters) in length or less if desired. If hoses are quite long, back flow check valves can be used in the hoses themselves to limit the volume subject to escape through a rupture.

Upon disconnection the dispensing flow is stopped from the storage tank by the shut off valves 28 and 30 while conventional back flow check valves on the truck tank protect against any truck back flow service tank loss.

VAPOR FLOW CONTROL VALVE

The vapor control valve 46 is a versatile valve installed in the vapor pressure equalizing conduit 16 that interconnects the vapor spaces of the storage tank 12 and the truck tank 13.

(1) It provides a pressure equalizing flow of vapor under pressure in either direction between the two tanks but primarily for optimum flow of vapor volume to the bulk storage tank equal to the liquid volume replaced, (2) It serves manually and automatically under surge as an excess vapor flow check valve under predetermined initial gauge pressure differentials, yet automatically equalizes pressures and reopens for repeat operation, (3) With equal facility and safety, it can serve equally well at the vapor outlet opening of each tank as a vapor excess flow check valve for both tanks should the hose 22 portion of conduit 16 be separated.

(4) Also it operates as an emergency shut off valve in event of fire, (5) Each valve may be hand closed when not in use, and (6) The displaced volume flow of the pressurized vapor is practically the same as the volume flow of the replacing liquid, any differential effect being related to the relative fluidity of vapor and liquid or tank temperatures.

As more particularly illustrated, the vapor flow check valve 46 has a body 50 shown herein which is externally threaded with a male thread 52 at its upstream end and its valve seat 48 disposed terminally at the end of the thread 52, facing towards the interior of the respective tank which it protects. The valve member 54 and the critical actuating elements can then be disposed within the threaded portion for their protective location within the confines of the tank against physical damage if the valve body is damaged or broken. At the other end, the body is internally threaded to receive the vapor conduit between the tanks. The valve opens to permit flow through the body 50 into the tank but controls vapor flow from the tank to equalize vapor pressures between the tanks 12 and 13 through the hose 22 during liquid transfer. The valve when free of this operation is normally closed for the connection and disconnection of the hose 22. Its working position is normally hand set at its excess flow control position to permit equalization of the vapor pressures of the two tanks in assisting flow control of the liquid in the liquid conduit 20 between them.

For these purposes, the valve member 54 is slidably mounted on the cylindrical end 58 of a centrally located reciprocable valve stem 60 which terminally is of reduced diameter to provide an appreciable clearance at 62 between them. This clearance is open when the valve 54 is closed under excess flow conditions thereby permitting controlled equalization of pressures on opposite sides thereof. Otherwise the clearance 62 is closed by a resilient stop washer 64 serving as a valve supported by a nut 66 threaded to the stem 60 as positioned by a shoulder 68. When free to do so, the valve 54 is held open by the excess flow spring 70.

The valve stem 60 supporting the valve member 54 is slidably mounted for reciprocation through a foraminated stem guide 72 that is held at the valve end against a fixed stop or shoulder 74 of the valve housing by an expansion spring 76.

At its other end the stem 60 rigidly carries a yoke 78 having a chordal flat 80 on its periphery that is grooved lengthwise thereof at 82 to serve as a follower and receives slidably therein a cam or crank pin 84 on the lower end of a manually rotated shaft 86 journaled in the body bushing 88 whose axis is disposed at a right angle to the flat 80 and slot 82.

Figure 2:
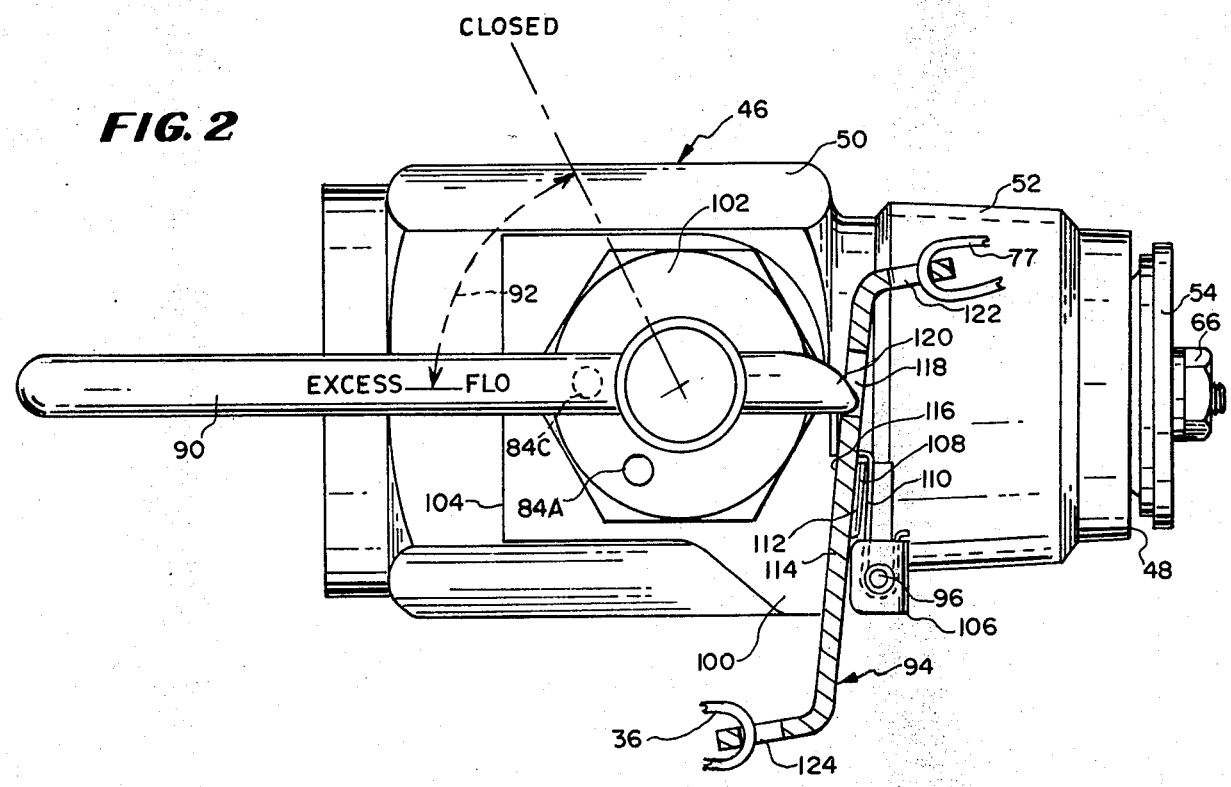
FIG. 2 is a top plan view of the vapor flow check valve and controls.

The dimensions are such, preferably, that rotation of the handle 90 and shaft 86 within a range of 60°, or more, with respect to the slot, cams the stem 60 and controls the movement of the valve 54 between two positions, namely, a fully closed position with the pin 84 at 84C, and, an excess flow control position with the pin at 84A (FIG. 2). Preferably, a less than 60° rotation of the shaft 86 manually advances the stem 60 to locate the pin 84 in its excess flow position so that in both of its two positions the pin 84 is located in slot 82 laterally of the center line of the stem 60, so that the pin is subjected to reverse movement under the effort of the compressed spring 76 whereby the slot slidably cranks the pin 84 to drive the valve 54 to its closed position when free to do so.

Referring to FIG. 2, the handle 90 is rotationally oriented to transverse in the arc of 92 as shown and is latched in the excess flow position of the valve with the crank pin 84 located at 84A when moved thereto from either its closed or open positions.

The latching of the handle 90 in its excess flow position is accomplished by a safety release latch member 94 that is supported on a bracket 100 (FIG. 2). The bracket 100 is secured by a ring nut 102 on the body bushing 88 and is locked against rotation by engagement with the valve body 50 at 104. The bracket 100 is L-shaped and provides a journal 106 that supports a vertical pin 96 upon which is pivotally mounted an arm 108 urged by a torsion spring 110 to move counter clockwise, as viewed in FIG. 2. The latch member 94 is joined to the arm 108 by means of an eutectic alloy 112 having a melting point between 212°–250° F. (100°–125° C.).

The latch member is in the form of a cross arm 114 with a camming surface 116 ending in an opening 118 intermediate its ends that receives the tapered end 120 of the handle 90 in the latched relation in the valve open position. The ends of the cross arm 114 have openings 122 and 124 which receive the ends of one or more of the pull cables 34 or 36, or both and manual cable 77.

In operation, when heat loosens the alloy 112 and frees the latch member 94 from any support, or the cross arm 114 has been moved by any of the cables, the latching effect on the handle is released. Once released, under the effort of the compression spring 76, the valve 54 and the handle 92 are moved to their "closed" positions to function as a vapor flow cut off valve to protect against any flow, and particularly back flow, of vapor from the storage tank 12. Restoring the valve 54 to an open position could only follow after a human check and repair has been made of the system.

It will be appreciated that in the transfer of liquified petroleum gas from one tank to another, even with short hoses 20 and 22, appreciable time can be required for the equalization of pressures before excess flow valves can open automatically. With the present excess flow valves, which can be used at opposite ends of a connectible transfer conduit, one may close before equalization is attained thereby requiring time for equalization.

The excess flow valve of the present invention is particularly useful with two of them used at opposite ends of a fluid hose connection. Not only does the upstream valve open wide, but the downstream valve opens with little pressure beyond it, particularly if associated with as empty tank to be filled, but closed as an excess flow check valve when necessary. Temperature differentials between tanks can provide this situation also, but equalization can be accomplished immediately with manual attendance and holding the downstream valve open until equalization is quickly attained.

What is claimed is:

1. In a liquified petroleum gas system, a fluid excess flow check valve comprising a valve body defining a flow compartment and an outwardly facing valve seat; a valve stem reciprocably supported in the valve body and having a first end thereof extending through said valve seat; a valve member slidably supported on the first end of the valve stem for cooperation with said valve seat; a terminal stop element on the first end of said valve stem positioned outwardly of said valve member to engage said valve member and limit movement thereof relative to said valve stem; first biasing means extending between said valve member and said valve body to bias said valve member outwardly from said valve seat against said terminal stop element; second biasing means extending between said valve member and a second end of said valve stem to bias the second end of said valve stem away from said valve seat; a handle external to said valve body which is movable between closed and excess flow responsive open positions, a shaft mounted for rotation on said valve body to rotate between a closed and an excess flow responsive open position for said valve member, the central axis of said shaft being substantially aligned with and perpendicular to the central longitudinal axis of the valve stem, a crank pin projecting from the shaft at the innermost end thereof, said crank pin being offset laterally from the central longitudinal axis of said shaft, and yoke means formed on the second end of said valve stem, said yoke means being provided with a slot which receives said crank pin; said crank pin being substantially aligned with the central longitudinal axis of said valve stem when said valve means is in the closed position and offset laterally from the central longitudinal axis when said shaft is rotated away from the closed position and toward the excess flow responsive open position; and a latch member releasably engaging said handle in the excess flow responsive open position, said latch member pivotally supported by an arm pivotally mounted on a bracket secured to said valve body, said arm being joined to said latch member by heat responsive means operative to cause said latch member to release said handle when subjected to a temperature in excess of a predetermined temperature, said arm further including pivoted locking bar means to releasably engage said handle in the excess flow responsive open position and actuating means secured to said locking bar and operable to pivot said locking bar on said arm to release said handle.

* * * * *